G. A. WARNER.
BRICK CONVEYER.
APPLICATION FILED OCT. 12, 1915.
1,176,258.
Patented Mar. 21, 1916.
2 SHEETS—SHEET 1.
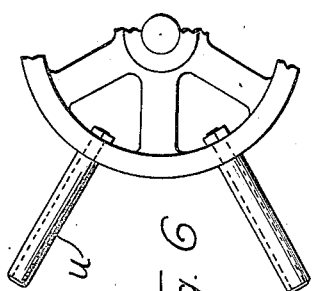
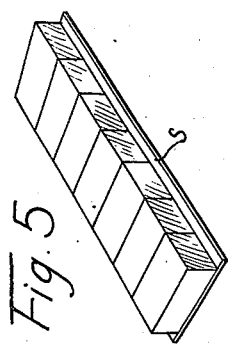
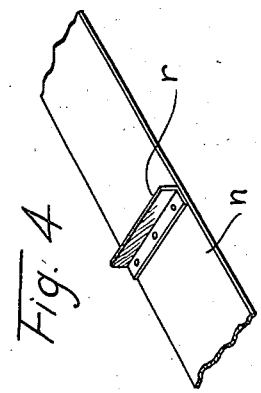
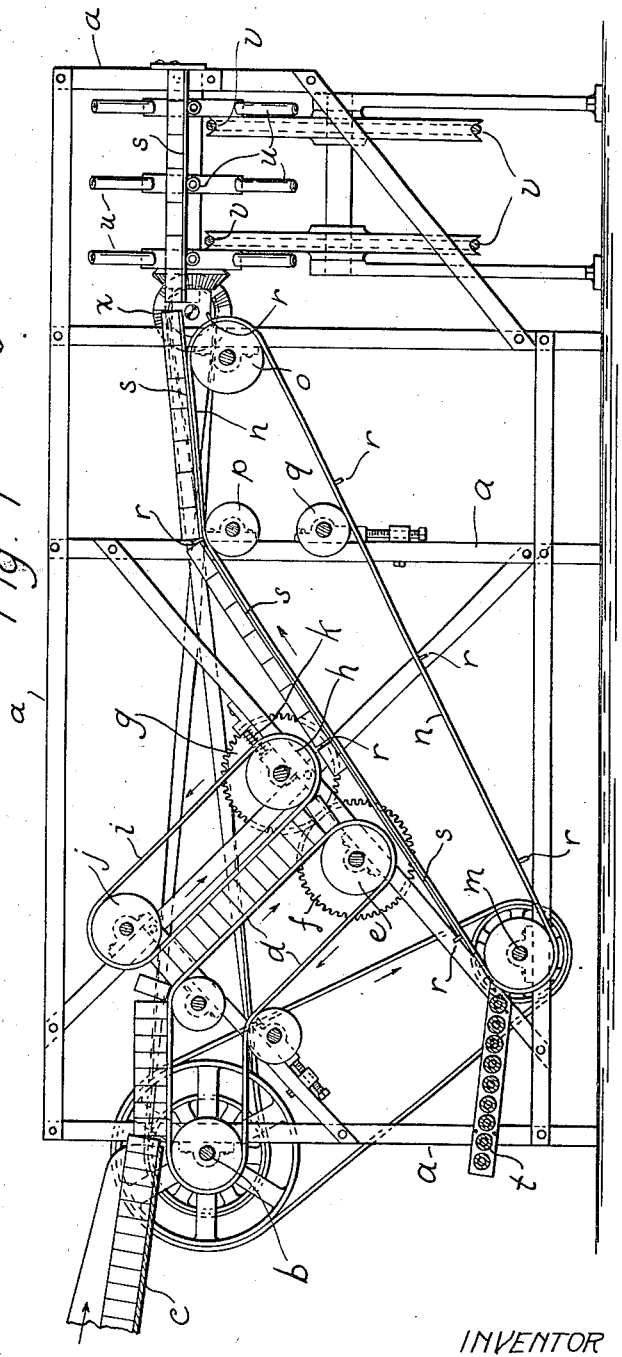
INVENTOR
George A. Warner
BY Ralzemond A. Parker
ATTORNEY

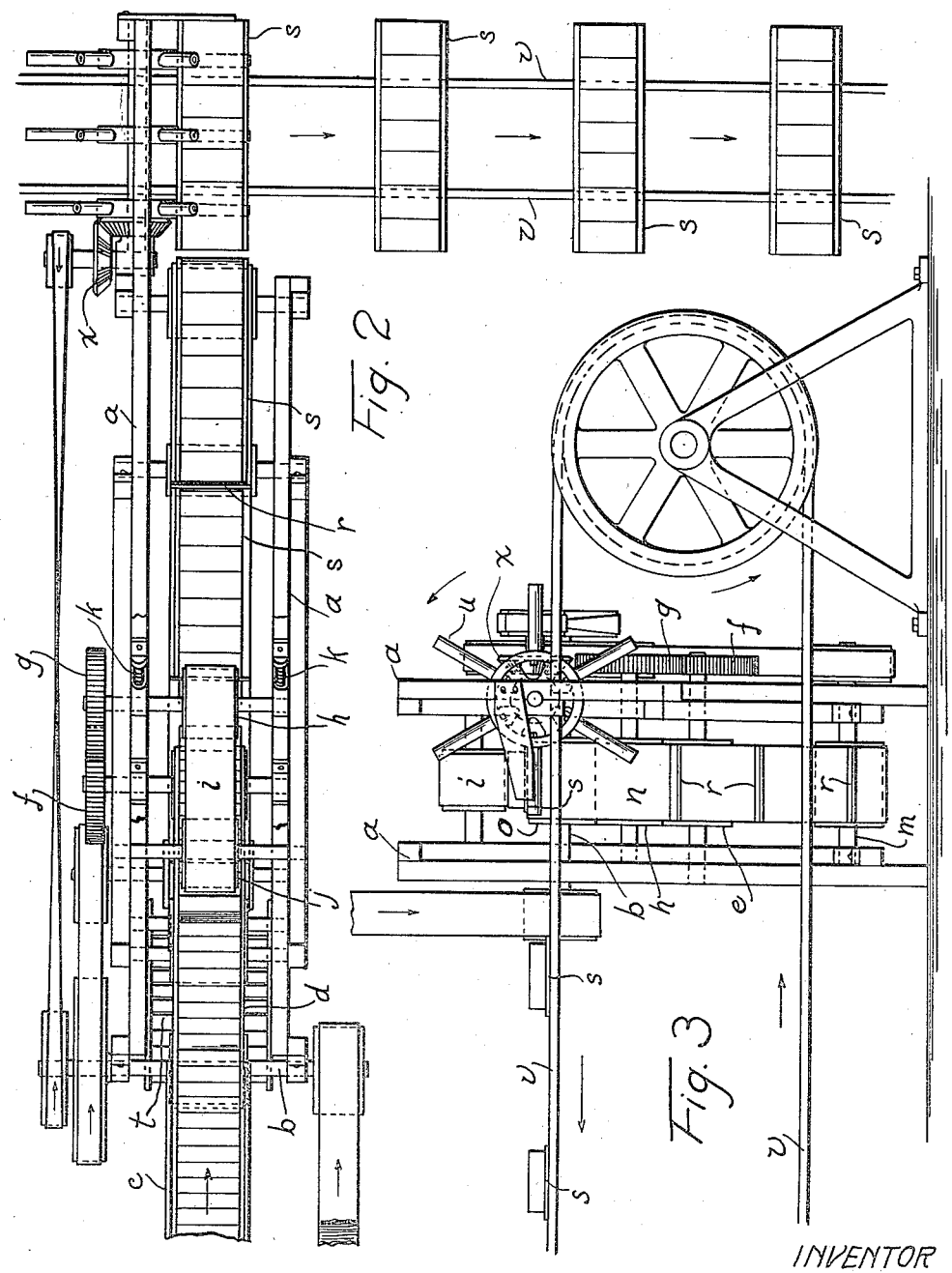

UNITED STATES PATENT OFFICE.

GEORGE A. WARNER, OF SPRINGWELLS, MICHIGAN.

BRICK-CONVEYER.

1,176,258.   Specification of Letters Patent.   Patented Mar. 21, 1916.

Application filed October 12, 1915. Serial No. 55,542.

*To all whom it may concern:*

Be it known that I, GEORGE A. WARNER, a citizen of the United States, residing at Springwells, county of Wayne, State of Michigan, have invented a certain new and useful Improvement in Brick-Conveyers, and declare the following to be a full, clear, and exact description of the same, such as will enable others skilled in the art to which it pertains to make and use the same, reference being had to the accompanying drawings, which form a part of this specification.

This invention relates to brick conveyers and has for its object apparatus adapted to convey the molded bricks in their plastic condition from the brick cutter to pallets upon which they are dropped after having been turned; thence conveying the pallets to a conveyer cable running at right angles and along the steam-pipe racks, upon which they are placed by workmen to allow them to dry.

The nature of this apparatus and the detailed construction will be understood from the description following.

In the drawings, Figure 1 is a side elevation of the apparatus. Fig. 2 is a plan view. Fig. 3 is an elevation take from the right of Figs. 1 or 2. Fig. 4 is a fragment of the belt which conveys the pallets. Fig. 5 is a perspective of a pallet loaded with brick. Fig. 6 is a fragment of one of the transfer wheels.

The frame of the machine is designated $a$ and comprises the necessary uprights and cross bars to support the gear wheels and pulleys which are shown in the drawings. Inasmuch as this is a common construction the details of this need not be described, but they are apparent from the drawing.

$b$ designates the master pulley shaft from which all the apparatus with the exception of the final conveyer is driven.

$c$ represents the chute from the brick cutting machine (not shown). The bricks come down the chute *seriatim* and are pushed along intermittently so that they drop off the end of the chute on their sides on to the conveyer belt $d$. In Fig. 1 this operation is shown. The conveyer belt $d$ is driven by the pulley on the master pulley shaft and runs over a pair of idlers, as is shown in Fig. 1, to give it a downward bend (for turning the bricks as will be hereinafter explained), and turns at the bottom around a pulley $e$ to which is attached a driving gear $f$ which meshes with a driven gear $g$. To this driven gear is attached a pulley wheel $h$, which carries an auxiliary conveyer belt $i$ that turns at the top about an idler pulley $j$. It will be noted that this auxiliary pulley belt parallels the downgoing run of the main conveyer belt $d$ for the purpose of engaging the plastic bricks at their tops and prevent their sliding and tumbling down the down-going run of the main conveyer belt $d$, and for the purpose of assisting in turning the bricks as will be hereinafter described. The auxiliary belt by engaging the tops of the bricks, also serves to help them along. It will be noted that the contact of the auxiliary belt with the tops of the bricks is a yielding one by reason of the bearings of the auxiliary pulley wheel drive shaft being slidable and provided with a coiled spring $k$ which normally tends to press the auxiliary belt pulley and the auxiliary belt into engagement with the tops of the bricks.

It will be noted that the master pulley shaft by suitable pulley and belt connections, drives the pulley shaft $m$, which in turn drives the pulley over which runs the conveyer belt $n$, which for the purpose of reference in the claims will be known as the intermediary conveyer or conveyer belt. This belt $n$ runs over three idlers $o$, $p$ and $q$, the last of which is adjustable to alter the tension of the belt. This intermediary belt $n$ is divided at equal distant points with angle iron bars $r$, (see Fig. 4 in particular). These are simply catches which are located on the belt to carry up the pallets $s$ (see in particular Fig. 5). At the lower left hand end of the machine as shown in Fig. 1, is provided a plurality of rollers $t$. These are for the purpose of feeding the pallets upon the intermediary belt $n$. The pallets are slipped on to the rollers and on the belt at the proper times by an operator. As the pallets run upward on the intermediary conveyer $n$ they go gradually on to the position where the bricks are dropped from the first conveyer and its auxiliary. By the proper timing of the first conveyer and its auxiliary on the one hand and the intermediary conveyer on the other, these pallets are conveyed along just fast enough to neatly drop the bricks on the pallets, as shown in Fig. 5, there always being a given number of bricks dropped on the pallet, here shown for convenience as seven.

Now, the feeding of the bricks from the initial conveyer to the intermediary conveyer, by the aid of the auxiliary conveyer, is important, as the bricks come from a fast working brick-cutting machine lying on their sides, and it is necessary that they be turned and placed on the pallets so that they lie on their faces of largest area. This the initial and auxiliary conveyers working in conjunction with the intermediary conveyer, do, as clearly shown in Fig. 1.

When the pallets reach the top of the intermediary conveyer $n$, they are filled with brick lying on their surfaces of largest area, and at the turn of the conveyer around the idler $o$, the pallets are shoved off from the intermediary conveyer on to the set of arms of the intermittently rotated transfer wheels, as shown in Fig. 1. The transfer wheels comprise a set of three wheels, each provided with a plurality of radial arms $u$, each of which has a roller sheathing on the entire arm, that is to say, the arm comprises a shaft upon which is rotatably mounted a long sleeve. These roller arms thereby facilitate the sliding of the pallets on to the transfer wheels. After the pallet has been pushed on to the transfer wheels, these are rotated by the toothed portion of the mutilated driving pinion $x$ and drop the pallet on to the final conveyer cables $v$.

Enough friction can be provided in the transfer wheel shaft and its bearings to prevent overthrow of the transfer wheels when the teeth of the driving pinion are out of engagement with the driven pinion, or any one of the several devices for this purpose could be provided.

The final conveyer cables run at right angles to the intermediary conveyer for a considerable distance between the steampipe racks (not shown, but which are provided in most up-to-date brick yards for the purpose of drying the bricks). From the final conveyer cables the pallets are taken off by workmen along the steam-pipe racks and placed, pallet and all, upon the steam-pipe racks to dry. It will, therefore, be seen that my conveyer is arranged to take the bricks from the molding machine or cutter, automatically set them upon their faces of largest area and transfer them to the long final conveyer which carries them to the workmen who transfer them to the pipe racks. the only manual labor required in the operation being the feeding of the pallets upon the intermediary conveyer. However, suitable mechanism could be designed to accomplish this purpose, but inasmuch as that is not a necessary part of my invention this need not be considered.

What I claim is:

1. In a brick conveyer, the combination of an initial conveyer for the plastic brick carried on their sides, an intermediary conveyer for the pallets arranged below at one end of the said initial conveyer and timed to receive upon the pallets the plastic bricks dropped from the initial conveyers upon their surfaces of largest area, a final conveyer running at right angles to the intermediary conveyer, and a transfer device for automatically transferring the bricks from the intermediary conveyer to the final conveyer.

2. In a brick conveyer, the combination of an initial conveyer for the plastic bricks, an intermediary conveyer for the pallets, the intermediary conveyer and the initial conveyer arranged, the former at the end and under the latter so that the initial conveyer drops the plastic bricks upon the pallets carried on the intermediary conveyer, and turns the bricks as they drop off the end of the initial carrier, and means for driving the two carriers at such relative speeds as the bricks will take their places on the pallets one right behind the other.

3. In a brick conveyer, the combination of an initial conveyer for the plastic bricks, having a down-running portion. and an auxiliary conveyer in connection with the initial conveyer for engaging the tops of the bricks along the downgoing portion, and an intermediary conveyer upon which the bricks are carried from the initial conveyer and the auxiliary conveyer.

4. In a brick conveyer, the combination of an initial conveyer belt and an auxiliary belt for yieldingly engaging the tops of the bricks running along the initial belt, and an intermediary conveyer at one end of and below the initial conveyer belt and auxiliary belt and upon which the bricks are carried from the initial conveyer and the auxiliary conveyer.

5. In a brick conveyer, the combination of an initial conveyer for the plastic brick, an intermediary conveyer provided with catches at equal distant points along the conveyer for the purpose of carrying pallets, said intermediary conveyer and initial conveyer belt being timed so that the initial conveyer belt drops the plastic bricks upon the pallets *seriatim*, and a final conveyer upon which the pallets are transferred from the intermediary conveyer belt.

6. In a brick conveyer, the combination of an initial conveyer for the plastic brick, an intermediary conveyer for the pallets, the intermediary conveyer and the initial conveyer being timed to load the pallets with the plastic bricks *seriatim*, a final conveyer, and a transfer device between the intermediary conveyer and the final conveyer, and comprising a plurality of wheels with radial arms.

7. In a brick conveyer, the combination of an initial conveyer, an intermediary conveyer, the latter conveyer arranged to carry pallets and the two conveyers timed so that plastic bricks are dropped from the initial conveyer on to the pallets carried by the intermediary conveyer, a final conveyer, and a transfer device between the final conveyer and the intermediary conveyer and comprising a plurality of wheels having radial arms provided with rollers.

8. In a brick conveyer, the combination of an initial conveyer having a down-going portion, an auxiliary belt for preventing the tipping of the bricks on the downgoing portion, an intermediary conveyer provided with catches for carrying pallets, and a plurality of rollers adjacent the lower end of the intermediary conveyer for the purpose of allowing the feeding of the pallets thereon, the said intermediary conveyer and initial conveyer and its auxiliary being timed so that the plastic bricks are turned and dropped on to the pallets *seriatim* as the pallets pass up through the intermediary conveyer.

9. In a brick conveyer, the combination of means for conveying and turning the bricks, and means for conveying pallets upon which the turned bricks are dropped.

In testimony whereof, I sign this specification.

GEORGE A. WARNER.